(12) United States Patent
Scharrenbach et al.

(10) Patent No.: US 10,717,089 B2
(45) Date of Patent: Jul. 21, 2020

(54) AQUEOUS SEPARATION LIQUID AND PROCESS FOR REMOVING PAINT OVERSPRAY FROM A PAINT SPRAY BOOTH

(71) Applicant: PPG Industries Ohio, Inc., Cleveland, OH (US)

(72) Inventors: Frank Scharrenbach, Heidelberg (DE); Desiree Hofmann, Schwetzingen (DE); Dietmar Kascha, Eschborn (DE)

(73) Assignee: PPG Industries Ohio, Inc., Cleveland, OH (US)

( * ) Notice: Subject to any disclaimer, the term of this patent is extended or adjusted under 35 U.S.C. 154(b) by 367 days.

(21) Appl. No.: 15/510,642

(22) PCT Filed: Sep. 10, 2015

(86) PCT No.: PCT/US2015/049322
§ 371 (c)(1),
(2) Date: Mar. 10, 2017

(87) PCT Pub. No.: WO2016/040563
PCT Pub. Date: Mar. 17, 2016

(65) Prior Publication Data
US 2017/0189928 A1   Jul. 6, 2017

(30) Foreign Application Priority Data
Sep. 10, 2014   (EP) .................... 14184286

(51) Int. Cl.
| | | |
|---|---|---|
| *B03C 3/017* | (2006.01) | |
| *B03C 3/16* | (2006.01) | |
| *B03C 3/41* | (2006.01) | |
| *C09D 7/00* | (2018.01) | |
| *C09K 3/22* | (2006.01) | |
| *B05B 14/462* | (2018.01) | |
| *B05B 14/46* | (2018.01) | |
| *B05B 14/42* | (2018.01) | |
| *B01D 47/00* | (2006.01) | |

(52) U.S. Cl.
CPC ............. *B03C 3/41* (2013.01); *B03C 3/017* (2013.01); *B03C 3/16* (2013.01); *B05B 14/42* (2018.02); *B05B 14/46* (2018.02); *B05B 14/462* (2018.02); *C09D 7/71* (2018.01); *C09K 3/22* (2013.01); *B01D 47/00* (2013.01)

(58) Field of Classification Search
CPC .......... B01D 47/00; B03C 3/017; B03C 3/16; B03C 3/41; B05B 14/42; B05B 14/46; B05B 14/462; C09D 7/71; C09K 3/22
See application file for complete search history.

(56) References Cited

U.S. PATENT DOCUMENTS

| | | | |
|---|---|---|---|
| 4,748,049 A | 5/1988 | Charles et al. | |
| 5,098,450 A | 3/1992 | Patzelt et al. | |
| 5,201,946 A | 4/1993 | Marsek | |
| 5,308,647 A | 5/1994 | Lappi | |
| 5,334,255 A | 8/1994 | James et al. | |
| 5,420,015 A | 5/1995 | Wuerch | |
| 6,136,220 A | 10/2000 | Agree et al. | |
| 2002/0017223 A1 | 2/2002 | Summerfield | |
| 2002/0174949 A1 | 11/2002 | Van Tyle | |
| 2011/0226127 A1 | 9/2011 | Dingler et al. | |
| 2012/0149616 A1 | 6/2012 | Schmid-Amelunxen et al. | |
| 2012/0177818 A1 | 7/2012 | Trivedi et al. | |
| 2014/0158043 A1* | 6/2014 | Woodhall | B05B 16/40 118/70 |

FOREIGN PATENT DOCUMENTS

| | | |
|---|---|---|
| GB | 2001258 | 1/1979 |
| RU | 2128088 C1 | 3/1999 |
| RU | 2161074 C1 | 12/2000 |
| SU | 1316712 A1 | 6/1987 |
| WO | 2008067880 A2 | 6/2008 |
| WO | 2009061821 A2 | 5/2009 |
| WO | 2010025810 A1 | 3/2010 |
| WO | 2011110302 A1 | 9/2011 |

OTHER PUBLICATIONS

Cekol 150 product data sheet; CP Kelco; 2009, revision 2016 (Year: 2009).*

* cited by examiner

*Primary Examiner* — Cabrena Holecek
(74) *Attorney, Agent, or Firm* — Charles M. Yeomans

(57) ABSTRACT

The present invention relates to an aqueous separation liquid comprising at least 49.9 wt. % water, 5 to 50 wt. % of at least one organic water-soluble polyol, based on the total weight of the aqueous separation liquid, and at least one low molecular weight cellulose derivative as rheology modifier, and to the use of this liquid in a process for removing paint overspray from a paint spray booth.

20 Claims, No Drawings

AQUEOUS SEPARATION LIQUID AND PROCESS FOR REMOVING PAINT OVERSPRAY FROM A PAINT SPRAY BOOTH

The present invention relates to an aqueous separation liquid for capturing paint overspray from a gas stream, to a process for removing paint overspray from a paint spray booth making use of said aqueous separation liquid and a method for painting a substrate utilizing the process for removing paint overspray from a paint spray booth.

BACKGROUND OF THE INVENTION

Various commercial articles such as automotive, marine and aircraft bodies, construction and machine parts and furniture are spray painted for surface protection, coloring and other purposes. The paint, which generally comprises solids as well as solvents and/or binder, is typically applied manually or automatically to the object to be painted in an enclosed area, i.e. a spray booth, in order to avoid contamination of the surface of the object being painted and to confine the paint spray to the interior of the booth for protecting the environment and the health of workers at the site. Generally only a portion of the sprayed paint is transferred to the object being painted. The other portion of the sprayed paint, i.e. the portion that is not transferred to the object being painted, commonly referred to as overspray, is usually swept by a gas stream such as a forced airflow through the booth to a separation unit, where the overspray is removed from the overspray-laden gas stream.

In small spray booths, filters are frequently used to remove paint particles from the gas stream. However, such dry separation units require comparatively intensive maintenance and the spent filters have to be disposed, which increases the costs for operation. In large scale systems with high paints consumption, e.g. paint lines in the automotive industry, thus mainly wet separation units such as for example described in DE 44 01 741 C2 are employed. Such wet separation units typically comprise a funnel-type streaming channel located underneath the grid floor of the working area of the booth. Separation liquid is continuously supplied at the upper rims of the streaming channel and flows as a continuous film under the effect of gravity over the channel walls thereby capturing a portion of the overspray particles from the gas stream, which is conducted downward by the funnel-like structure. Downstream of the funnel-like structure a nozzle is provided, which causes intense mixing of the overspray-laden gas stream with the separation liquid in a turbulent zone thereby removing substantially the remaining portion of the overspray particles from the gas stream. Although adequate cleaning performance may be achieved by such conventional wet separation systems, the energy consumption for maintaining the high velocity gas stream is quite high due to a significant pressure drop at the nozzle. Furthermore, the gas stream takes up large amounts of moisture due to the intense turbulent mixing with an aqueous separation liquid, which is disadvantageous with regards to a desirable circulation of the gas since it necessitates prior energy intensive adjustment of the temperature and moisture content of the gas.

WO 2010/025810 A1 discloses a system and process, which do not rely on turbulent mixing for efficient removal of paint overspray from the gas stream, but are rather based on electrostatic scrubbing. Herein an overspray-laden air stream is conducted e.g. via two spaced downward converging baffle plates arranged in V-shape underneath the paint spray booth to an electrostatic wet deposition device for removal of the overspray particles from the gas stream. This deposition device includes multiple parallel and vertically arranged deposition units spaced from one another, which each comprise two parallel spaced rectangular side sheets whose upper edges are connected via a curved top having a semicircular cross-section with a central groove. A grid electrode topped by wire electrodes is arranged parallel-sided between each pair of deposition units and is connected to a high voltage source to charge the electrodes negatively with respect to the deposition units, which are grounded. Overspray particles entrained in the air stream that is conducted downward in the space between the deposition units are ionized through corona discharge at the wire electrodes. The resulting negatively charged paint particles are subsequently accelerated by the potential gradient in the electric field between the respective grid electrode and the adjacent side sheets of deposition units towards the positively charged sheets. A separation liquid is supplied via the groove at the top of each deposition unit to the vertical side sheets thereof where it forms a continuous film flowing downward, which captures and removes the attracted ionized overspray particles from the air stream. The separation liquid is collected at the bottom of the deposition units for subsequent treatment to remove the paint components and may afterwards be returned to the deposition units. A system, which is a further development of the system disclosed in WO 2010/025810 is commercially available from EISENMANN Anlagenbau GmbH & Co. KG under the name E-Scrub. Due to the absence of pronounced bottlenecks in the flow path, the pressure drop in such system is comparatively low. According to information of the manufacturer, the E-Scrub system enables efficient removal of overspray from air streams of paint booths with up to 95% air recirculation, requiring up to 86% less water and allowing a reduction of energy consumption of up to 75% compared to conventional wet separation units for paint spray booths. Nevertheless, the system as operated with conventional separation liquids known in the art remains prone to paint deposits adherent to the deposition sheets, which locally disturb the wetting of the sheet surface and affect the electrical field, and may ultimately cause arcing. Thus special constructional means such as an oscillating mechanical element causing waves on the flowing film to improve the wash off efficiency and/or relatively frequent maintenance work is required to avoid or remove disturbing paint deposits for stable operation of the process.

The separation liquids known in the art for the use in wet separation units for the removal of paint overspray from a gas stream are generally water-based or oil-based. Water is preferable as carrier liquid for economical and safety reasons, in particular when used in wet separation units that include possible ignition sources such as high voltages. Aqueous separation liquids typically comprise additionally one or more than one water-soluble organic solvent that facilitates take up and dispersion of the overspray particles. For appropriate wetting of the deposition surfaces, the surface tension of the liquid is moreover typically reduced by the use of one or more surfactants, most commonly fatty alcohol alkoxylates. Furthermore, as described e.g. in WO 2010/025810, the aqueous separation liquids may contain a detackifying agent such as silicates, salts of Al, Zn, Fe, Ca or Zr, amines or certain polymers for eliminating the tackiness of the captured overspray particles to prevent their adherence to the deposition sheets and a clogging of lines, pumps and containers in the treatment and circulation system. Additionally a thickener may be employed for increasing the viscosity of the liquid to enable the formation of a continuous coherent film flowing downward on strongly inclined or even vertical deposition structures. Among the thickeners previously employed for the formulation of aqueous separation liquids are inter alia high molecular cellulose derivatives such as Natrosol 250 HHR, which has a Brookfield viscosity in 1 wt. % aqueous solution of about 3,400 to 5,500 mPa·s. In accordance with the general understanding, the high molecular weight of these compounds renders them particularly effective as thickener requiring thereby only low amounts for adjusting the desired viscosity level of the separation liquid. There is no disclosure in the prior art about employing cellulose derivatives of low molecular weight in aqueous separation liquids for the removal of paint overspray.

Conventional aqueous separation liquids typically have a viscosity in terms of outflow time as measured according to ISO 2431 with a 4 mm flow cup at 20° C. of more than 40 s. Such viscosity markedly higher than the viscosity of water is considered helpful in obtaining a substantially continuous coherent film flowing on strongly inclined surfaces and provide sufficient cohesion to prevent local dewetting or a detachment of droplets e.g. at local defects or edges on the flow path of the liquid. Due to their substantial viscosity these conventional aqueous separation liquids are used in wet separation units at comparatively low flow rates, typically of about 2 L/(m$^2$·min) or less. However, de-aerating the liquid as well as cost-efficient industrial standard methods for separation of the paint components from the used separation liquid such as centrifugation-based techniques become increasingly difficult to carry out the higher the viscosity of the separation liquid. Moreover, it is difficult to achieve the desirable film uniformity avoiding e.g. the formation of hangers at these viscosity levels.

EP 2 365 037 A1 proposes aqueous separation liquids, which have a significantly lower viscosity comprising at least 49.95 wt. % water, at least one non-ionic surfactant and 5 to 50 wt. % of an organic water-soluble film-supporting component selected from certain monomeric or polymeric polyols. Herein, the viscosity may be adjusted by addition of a high molecular cellulosic thickener such as Tylose 100,000 YP2, which was used throughout the Examples. Such low viscosity aqueous separation liquids are compatible with industrial standard methods for separation of the paint components and enable forming uniform continuous flowing films having a film thickness as low as 50 µm or less on strongly inclined or even vertical deposition structures at conventional flow rates. According to EP 2 365 037 A1 the low film thicknesses are seen as a particular advantage because they correspond to a reduction in the amount of separation liquid to be circulated thus saving energy. However, turbulences in the high velocity gas stream and distortions have to be avoided in order to maintain such uniform continuous thin films and prevent a local dewetting of the deposition surfaces. Moreover, for such low film thicknesses there is the risk that some impinging overspray particles, in particular those of large size and/or high impact energy, may penetrate through the liquid film to contact the bare underlying deposition sheet and stick thereto. A lack of cohesion of the liquid prevents on the other hand substantially increasing the film thickness since at the corresponding higher flow rates a detachment of droplets due to inertia occurs at discontinuities on the flow path. Accordingly, it was observed that flowing films of the aqueous separation liquids known from EP 2 365 037 A1, which may be uniform, smooth and continuous on planar inclined deposition sheets, tend to become non-uniform in thickness, to tear and/or to form droplets at edges, distinctly curved elements and local structural defects on the flow path. The presence of edges and curved elements of the structural parts in contact with the separation liquid is common in the design of wet separation units due to requirements such as confining and/or directing the gas stream or effective application of the separation liquid to the deposition structures from a liquid reservoir. With the aqueous separation liquids known from the prior art there may thus occur insufficiently wetted or partly non-wetted areas on the deposition sheets, so that impinging paint particles from the gas stream can adhere to these surfaces leading to possible fouling of the surface, which makes it virtually impossible to retain a continuous film on these surfaces, necessitating maintenance work for removal of the adherent fouling paint. These detrimental effects are even more pronounced in wet electrostatic separation units since any paint deposits as well as films with significantly non-uniform thickness e.g. due to the formation of hangers will significantly affect the electrical field. Furthermore, droplets that detach from the flowing film of the separation liquid e.g. at edges can cause arcing in the high voltage electrical field. It would be desirable to avoid these disadvantageous effects for the sake of a more stable, reliable and maintenance free operation of wet separation units.

Moreover, an efficient removal of the captured paint components from the separation liquids of the prior art typically requires at least in the case of water-based paints the use of flocculants. These costly auxiliary agents are consumed upon paint removal and thus need to be replenished, if the separation liquid is circulated. Moreover, the use of flocculants is associated with the risk of an undesirable removal of functional components such as detackying agent or surfactants from the aqueous separation liquid together with the paint causing a need to control and, if required, adjust the composition of the separation liquid for the sake of a stable operational performance, when recycling the liquid.

Additionally, many aqueous separation liquids for the removal of paint overspray from a gas stream known from the prior art exhibit an undesirable inherent tendency to foaming. The suppression of foam formation thus regularly requires the addition of defoaming agents, which may however interact with other components of the separation liquid in an adverse manner affecting e.g. the film formation and increase the costs of the process. It would therefore be an advantage, if the separation liquid is less prone to foaming or ideally causes no foaming at all.

Consequently, the object of the present invention is to provide an aqueous separation liquid that exhibits enhanced flow characteristics enabling to form and maintain coherent, substantially uniform, continuously flowing films with a smooth or wavy surface structure, without the formation of hangers, on strongly inclined and/or vertical deposition structures even when exposed to a high velocity gas stream loaded with impinging particles and when edges, distinctly curved elements and/or local defects are within the flow path, avoiding in particular tearing of the film and/or droplet formation thereat. Such deposition liquid should be suitable for use in electrostatic wet separation units, allow effectively capturing paint overspray from different sources such as water-based paint compositions as well as solvent-based paint compositions without paint deposits adhering to the deposition structures and enable facile removal of the captured paint components from the separation liquid by established industrial methods, preferably without the need of flocculants. Preferably the separation liquid should have little or no inherent propensity to foaming and allow facile degassing.

Another object of the present invention is to provide an efficient process for removing paint overspray from a paint spray booth having a low energy consumption and enabling a high recycling ratio of all carrier streams used in the process, that allows a stable, safe and reliable operation with no or minimum maintenance for a prolonged period.

SUMMARY OF THE INVENTION

These objects have been attained by an aqueous separation liquid for capturing paint overspray from a gas stream comprising:
  a) at least 49.9 wt. % water, based on the total weight of the aqueous separation liquid,
  b) 5 to 50 wt. % of at least one organic water-soluble polyol, based on the total weight of the aqueous separation liquid, and
  c) at least one cellulose derivative having a viscosity of less than 200 mPa·s as measured with a Visco Tester VT5 using a R2 spindle at a velocity of rotation of 60 rpm and a temperature of 20° C. for a 1 wt. % solution of the cellulose derivative in water, based on the total weight of the solution,
  wherein components b) and c) are different from each other.

A further aspect of the present invention is a process for removing paint overspray from a paint spray booth comprising:
  i) directing a gas stream through a paint spray booth;
  ii) contacting paint overspray with the gas stream flowing through the paint booth thereby forming an overspray-laden gas stream containing paint particles and/or droplets dispersed therein,
  iii) forming a flowing substantially continuous liquid film of the above-mentioned aqueous separation liquid according to the present invention on at least one surface that defines at least a part of the flow path of the overspray-laden gas stream;
  iv) contacting the overspray-laden gas stream with said liquid film, thereby transferring paint particles and/or droplets from the overspray-laden gas stream into the separation liquid to form a paint loaded separation liquid; and
  v) removing the paint loaded separation liquid and the gas stream having a reduced overspray load.

Moreover, the present invention is related to a method for painting a substrate comprising:
  spraying a paint onto a substrate in a paint spray booth, thereby obtaining a painted substrate and paint overspray; and
  removing the paint overspray with the afore-mentioned process for removing paint overspray from a paint spray booth.

The present invention is based in particular on the surprising finding that liquids with very favorable paint capturing properties and flow characteristics for the efficient use as separation liquids in wet scrubbers for removing paint overspray from a gas stream of a paint spray booth can be obtained, if the liquid comprises a cellulose derivative of low molecular weight, especially when used in combination with a distinct organic water-soluble polyol component. As is common in the art, the viscosity of an aqueous solution of defined concentration can be used as a measure of the molecular weight of a cellulose derivative. In the context of the present invention "cellulose derivative of low molecular weight" or alike terms thus mean a cellulose derivative having a viscosity of less than 200 mPa·s, preferably even lower as set forth below, as measured with a Visco Tester VT5 using a R2 spindle at a velocity of rotation of 60 rpm and a temperature of 20° C. for a 1 wt. % solution of the cellulose derivative in water, based on the total weight of the solution. With the aqueous separation liquids according to the present invention it is possible to form substantially uniform coherent, continuously flowing films with smooth or wavy structure and without hangers on strongly inclined and/or vertical deposition structures, which remain stable and intact even upon exposure to a high velocity gas stream loaded with impinging particles and when edges, distinctly curved elements and/or local defects are within the flow path of the liquid. In particular, a tearing of the film, dewetting of the underlying deposition surface and formation of droplets at edges, distinctly curved elements and local defects within the flow path may thus be avoided. These flow characteristics are attainable also at comparatively high flow rates e.g. in the range of 3 to 15 L/(m$^2$·min) or even higher. Without intending to be bound by any theory, the inventors of the present invention believe that the foregoing favorable rheological properties are due to a less pseudoplastic behavior of aqueous solutions of cellulose derivatives of low molecular weight compared to analogous cellulose derivatives of substantially higher molecular weight, which are conventionally used as thickener. Apparently, the cellulose derivatives of low molecular weight provide sufficient cohesion that coherent continuously flowing films of substantially uniform thickness without hangers can be formed and maintained even under demanding flow conditions such as at high flow rates, flow over edges and under the impact of a high velocity gas stream without e.g. tearing or droplet detachment. It has furthermore unexpectedly been found that the combination of a cellulose derivative of suitably low molecular weight and a distinct organic water-soluble polyol may provide adequate wetting of deposition surfaces by the aqueous separation liquid without the necessity to add a surfactant.

Due to the foregoing unique rheological properties the aqueous separation liquids according to the present invention enable a stable, safe and reliable operation of the above process for removing paint overspray from a paint spray booth with no or minimum maintenance for a prolonged period. The attainable high flow rates provide comparatively thick flowing films increasing the barrier for impinging paint particles to penetrate through the film to the underlying surface. Thus paint deposits adhering to the deposition surfaces may be prevented more efficiently. The separation liquids according to the present invention were found suitable for use in different existing types of wet separation units including electrostatic scrubbers and to enable effective removal of overspray particles from different paint sources including water-based and solvent based paint formulations. Due to the comparatively low viscosities of the liquid the captured paint components may easily be removed by industrial standard techniques such as centrifugation. Moreover, the process according to the present invention does not necessarily rely on turbulent mixing of the overspray-laden gas stream with the separation liquid, which means that extensive accumulation of moisture in the gas stream can be avoided, thus simplifying purification and treatment of the gas stream obtained after the particle removal. Consequently, the process according to the present invention can be operated with high recycling ratio of all carrier streams, i.e. gas stream and aqueous separation liquid, and with low energy consumption.

DETAILED DESCRIPTION OF THE PRESENT INVENTION

As mentioned above, the separation liquid according to the present invention is aqueous comprising at least 49.9 wt % water, based on the total weight of the separation liquid. Preferably the separation liquid comprises at least 60 wt. %, more preferably at least 70 wt. % or more than 75 wt. %, or in some embodiments at least 80 wt. % of water, based on the total weight of the separation liquid. Water as basic carrier fluid is attractive due to cost reasons as well as for safety reasons, especially when used in connection with an electrostatic wet separation unit. It is preferable that the separation liquid comprises only a minimum of, such as less than 1 wt. % or less than 0.1 wt. %, of volatile organic compounds (VOCs), based on the total weight of the separation liquid. Herein, the term "volatile organic compound" shall mean any organic compound having at 20° C. and under standard atmospheric pressure (101.3 kPa) a vapor pressure of 10 Pa or more. Such volatile organic compounds are not desired from an emission point of view and from a safety point of view since they may form ignitable compositions, especially in combination with high voltage electrostatic scrubbing. Preferably the liquid is thus substantially free of volatile organic compounds or is completely free of volatile organic compounds. Herein, the term "substantially free" shall mean that the amount of possibly present VOCs is so small that it does not noticeably affect the properties of the separation liquid for the intended application in an adverse manner, whereas the term "completely free" shall be construed to include the presence of traces of VOCs inevitably present.

The aqueous separation liquid comprises further at least one organic water-soluble polyol. In the context of the present invention "water-soluble" means that the respective polyol dissolves in water in an amount of at least 50 g/L, preferably of at least 100 g/L, or of at least 200 g/L, or of at least 400 g/L at 20° C. The polyol to be used according to the present invention is preferentially an organic compound having a vapor pressure of less than 10 Pa, preferably less than 1 Pa, more preferably less than 0.5 Pa, and most preferred less than 0.1 Pa at 20° C. under standard atmospheric pressure (101.3 kPa). The polyol component of the separation liquid according to the present invention can be selected from monomeric polyols or polymeric polyols. Suitable monomeric polyols include for example ethylene glycol, propylene glycol, glycerol or pentaerythritol. Preferable are monomeric polyols that have at least three hydroxyl groups per molecule. Suitable polymeric polyols include for example poly(ethylene glycols), poly(propylene glycols), mixed poly((ethylene)(propylene) glycols), polyester polyols, acrylic polyols, polyvinyl alcohols and polyurethane polyols. Preferable are polymeric polyols having a number average molecular weight ($M_n$) in the range from 200 to 3,000, or 200 to 2,000, or 300 to 1,500, or 300 to 1,000 as measured by gel permeation chromatography using polystyrene calibration standards. In a particularly preferred embodiment the organic water-soluble polyol is selected from glycerol and poly(ethylene glycols). Etherified derivatives of the above-mentioned polyol compounds such as monoalkylethers of said alkylene glycols or poly(alkylene glycols) were found to be typically less effective and are accordingly preferably not used in the separation liquid according to the present invention.

The polyol component lowers the polarity of the water-based separation liquid and decreases the surface tension thereby enhancing its wetting capabilities and assists in the incorporation and dispersion of impinging overspray particles in the separation liquid. It helps to keep the deposition surfaces wet and to maintain a protective surface layer thereon, whereof paint particles may readily be washed off.

The amount of the organic water-soluble polyol component in the aqueous separation liquid according to the present invention depends on the specific compound(s) selected and which other components are present in the separation liquid and can thus be varied in the range from 5 to 50 wt.-% based on the total weight of the liquid. The separation liquid may for example comprise the at least one organic water-soluble polyol in an amount in the range from 7 wt. %, preferably 8 wt. %, more preferably 10 wt. %, to 40 wt. %, preferably 30 wt. %, more preferably 25 wt. %, most preferably 20 wt. %, based on the total weight of the liquid. If used in an amount below 5 wt. %, the wetting and dispersing capabilities may not be sufficient anymore to produce coherent continuously flowing films and to provide for appropriate incorporation of the impinging overspray particles. Moreover the protective layer on the deposition surfaces may be impaired. At amounts of the polyol component in excess of 50 wt. %, overspray particles that haven been captured from an overspray-laden gas stream could be dissolved instead of being dispersed in the separation liquid, which complicates the subsequent removal of the paint components from the liquid.

The aqueous separation liquid according to the present invention further comprises at least one cellulose derivative of low molecular weight. As pointed out above the viscosity of an aqueous solution of the cellulose derivative determined under specific conditions is used herein as a measure of the molecular weight as is common in the art. The cellulose derivative used in the separation liquid according to the present invention thus has a viscosity of less than 200 mPa·s, preferably less than 100 mPa·s, more preferable less than 50 mPa·s, most preferably less than 30 mPa·s, as measured with a Visco Tester VT5 using a R2 spindle at a velocity of rotation of 60 rpm and a temperature of 20° C. for a 1 wt. % solution of the cellulose derivative in water, based on the total weight of the solution. Typically the viscosity of the cellulose derivative as defined above is in a range from 10 mPa·s or from 20 mPa·s to less than 200 mPa·s, preferably less than 100 mPa·s, more preferable less than 50 mPa·s, most preferably less than 30 mPa·s. Such cellulose derivative acts as rheology modifier, which compared to analogous cellulose derivatives of higher molecular weight that have been used as thickener in aqueous separation liquids of the prior art, enable forming stable, substantially uniform, coherent, continuously flowing films without hangers on strongly inclined and/or vertical deposition structures, which remain intact when exposed to a high velocity gas stream loaded with impinging particles and when edges, distinctly curved elements and/or local defects are within the flow path thereby avoiding undesirable effects such as droplet formation or dewetting of the deposition surface. As discussed above, the inventors of the present invention believe, without intending to be bound by any theory, that these favorable flow properties of the separation liquid originate at least partly from a less pseudoplastic behavior of said cellulose derivatives of low molecular weight compared to analogous compounds of higher molecular weight. Moreover, it is contemplated that a possible degradation of the cellulosic backbone has less effect on the flow characteristics if the molecular weight is already initially low thus contributing to more stable rheological properties of the liquid. The use of a low molecular weight cellulose derivative as described herein as rheology modifier in liquids for removing paint overspray from a gas stream is novel and forms also part of the present invention.

Cellulose derivatives of low molecular weight suitable for the use in the aqueous separation liquid according to the present invention can be any compounds having a cellulose backbone, i.e. a structure of D-glucopyranose units connected by β-1,4 glycosidic bonding, wherein at least a portion of the hydroxyl groups at the 2-, 3- and/or 6-position of the glucopyranose repeating units are chemically modified. The cellulose derivative can for instance be selected from cellulose ether materials, cellulose ester materials and mixed cellulose ether ester materials, wherein at least a portion of the hydroxyl groups at the 2-, 3- and/or 6-position of the glucopyranose repeating units of the cellulose backbone are substituted by alkoxy groups, which may optionally have one or more functional groups such as hydroxyl group(s), and/or are esterified by an organic acid or inorganic acid. The cellulose derivative can for example be selected from methyl cellulose, ethyl cellulose, hydroxyethyl cellulose, hydroxypropyl cellulose, methyl hydroxyethyl cellulose, methyl hydroxypropyl cellulose, methyl ethyl cellulose, hydroxypropyl ethyl cellulose, carboxymethyl cellulose, triacetyl cellulose and cellulose acetate propionate, without being limited thereto. Preferably the cellulose derivative of low molecular weight is a cellulose ether, whereof hydroxyalkyl cellulose ether materials such as hydroxyethyl cellulose are considered particularly useful due to their hydrophilic nature and their low inherent propensity to foaming.

Such afore-mentioned cellulose derivatives of low molecular weight suitable in the present invention are commercially available e.g. from The Dow Chemical Company, Midland or Shin-Etsu, Japan and may be prepared as described for instance in "Comprehensive cellulose chemistry", volume 2, Wiley-VCH 2001. Cellulose ethers are for example typically obtained by treating cellulose raw material with an aqueous solution of NaOH or KOH to form water-soluble alkali cellulose, which is subsequently reacted with one or more etherification agent(s) such as alkyl halides like methyl chloride and/or epoxides such as ethylene oxide or propylene oxide, neutralization of the resulting cellulose ether material with an acid and purification of the product. Herein it is possible to obtain a cellulose derivative with the desired degree of substitution, which determines inter alia the hydrophilicity and solubility in water, by adjusting the equivalent ratio of etherification agent to alkali cellulose accordingly. Cellulose ethers used in the aqueous separation liquid of the present invention as cellulose derivative of low molecular weight can e.g. have a molar degree of substitution, i.e. the average number of added molecules of etherification agent per glucopyranose repeating unit, in the range from 0.1 to 3.0 such as from 1.0 to 2.9, or from 1.5 to 2.7, or from 2.0 to 2.5. In one particularly preferred embodiment the cellulose derivative is a hydroxyethyl cellulose having a molar degree of substitution in the range from 2.0 to 2.5. It is generally preferable that the cellulose derivative used in the aqueous separation liquid according to the present invention is water-soluble, i.e. dissolves in water in an amount of at least 50 g/L, preferably at least 100 g/L, or at least 200 g/L, or at least 400 g/L at 20° C. The molecular weight can be adjusted by subjecting either the cellulose raw material or the cellulose derivative obtained therefrom to depolymerization e.g. by acid-catalyzed hydrolysis until the desired molecular weight is obtained. Suitable processes for depolymerization of cellulose are described for instance in U.S. Pat. Nos. 1,679,943, 2,413,802, US 2001/0020090 A1 and EP 0210917 A2.

The amount in which the at least one cellulose derivative of low molecular weight is comprised in the separation liquid depends inter alia on the targeted viscosity of the liquid. The separation liquid typically comprises said cellulose derivative component in an amount in the range from 0.1 wt. %, preferably 0.3 wt. %, more preferably 0.5 wt. %, most preferably 1 wt. %, to 10 wt. %, preferably 7 wt. %, more preferably 5 wt. %, most preferably 3 wt. %, based on the total weight of the liquid. The amount of cellulose derivative required for obtaining a liquid of a certain viscosity is generally higher for the low molecular weight cellulose derivatives compared to their higher molecular weight analogues, however, this drawback is more than compensated by the above-discussed superior properties of the separation liquid imparted by the low molecular weight cellulose derivatives, especially when used in combination with the organic water-soluble polyol component.

The viscosity of the aqueous separation liquid according to the present invention can be adjusted in a wide range. Typically the aqueous separation liquid according to the present invention has a viscosity in terms of outflow time in the range of 11 s to 50 s as measured according to ISO 2431:2011 (abbreviated herein as ISO 2431) using a 4 mm flow cup at 20° C. ISO 2431 discloses that the measuring standard is suitable for measuring viscosities of liquids showing an outflow time of at least 30 s. Nevertheless, the inventors realized that in the range of 10 s to 30 s still a very high reproducibility can be achieved, which confirms that contrary to the recommendation in ISO 2431 also liquids having an outflow time between 10 s and 30 s can reliably be measured using a 4 mm flow cup. Preferably, the viscosity of the aqueous separation liquid according to the present invention in terms of outflow time as measured according to ISO 2431 using a 4 mm flow cup at 20° C. is in the range from 15 s to 40 s, more preferably from 18 s to 30 s such as about 25 s. Consequently, the aqueous separation liquid according to the present invention can have a viscosity that is sufficiently low to allow easy separation of paint components using standard technology such as sedimentation, flotation and in particular centrifugation e.g. by an industrial decanter and enables forming substantially uniform continuously flowing coherent films on inclined deposition surfaces. At viscosities above 50 s outflow time measured as set forth above the formed films tend to be less uniform e.g. exhibiting hangers and the removal of captured paint components from the liquid as well as degassing of the liquid proves increasingly difficult.

For adjusting the viscosity of the aqueous separation liquid according to the present invention further rheology modifiers may be used in addition to components b) and c) as defined-above. Suitable further rheology modifiers include for example cellulose derivatives of high molecular weight (i.e. having a viscosity of more than 200 mPa·s as measured with a Visco Tester VT5 using a R2 spindle at a velocity of rotation of 60 rpm and a temperature of 20° C. for a 1 wt. % solution of the cellulose derivative in water, based on the total weight of the solution), polysaccharides, xanthan gum, gum Arabic, guar gum, starch and starch derivatives, polyvinyl alcohol and polyvinyl pyrrolidone. However, preferably the aqueous separation liquid comprises no such further rheology modifiers.

Optionally, the aqueous separation liquid according to the present invention may further comprise one or more than one surfactant e.g. anionic, cationic, amphoteric and/or non-ionic surfactant to decrease the surface tension of the liquid, improve its wetting capabilities and to assist in dispersing captured lipophilic paint components. However, in certain embodiments of the present invention, the wetting and dispersing capabilities imparted by the combination of the organic water-soluble polyol and the cellulose derivative of low molecular weight are sufficient for the intended use, so that it is not necessary to add a surfactant in addition to components b) and c). Anyway, if using surfactant(s), the surfactant system should be selected such that it does not impair the integrity and/or functionality of the other components of the separation liquid and enables stable long term performance in the removal of overspray particles from a gas stream of a paint spray booth.

These requirements are typically fulfilled best for non-ionic surfactants, whereas some ionic surfactants, i.e. cationic or anionic or amphoteric surfactants, may interact with paint components to an extent that the required wettability is difficult to maintain throughout a prolonged time of running the process according to the present invention, especially if the separation liquid is recycled. Therefore, according to one embodiment of the present invention the aqueous separation liquid is substantially free or completely free of ionic surfactants. Herein, the term "substantially free" shall mean that the amount of possibly present ionic surfactants is so small that it does not noticeably affect the properties of the separation liquid, whereas the term "completely free" shall be construed to include the presence of traces of ionic surfactants inevitably present.

In view of the foregoing the aqueous separation liquid according to the present invention may in particular comprise one or more than one non-ionic surfactant in addition to components b) and c). Suitable nonionic surfactants are for example poly(alkylene glycol) fatty alcohol ethers, alkylphenol poly(alkylene glycol) ethers, poly(alkylene glycol) fatty acid esters, fatty acid mono glycerides, poly(alkylene glycol) mono fatty acid esters, fatty acid mono alkanol amides, fatty acid dialkanol amides, alkoxylated fatty acid mono alkanol amides, alkoxylated fatty acid dialkanol amides, fatty acid partial esters of pentaerythritol, alkoxylated fatty acid partial esters of pentaerythritol, sorbitan fatty acid esters, alkoxylated sorbitan fatty acid esters, acetylenic diols, alkoxylated acetylenic diols, alkyl amino oxides, alkoxylated alkyl amino oxides, fluoro containing tensides, polysiloxane based tensides and combinations thereof. Herein poly(alkylene glycol) can in particular mean poly(ethylene glycol), poly(propylene glycol) or mixed poly((ethylene)(propylene) glycol) and alkoxylated can in particular mean ethoxylated, propoxylated, butoxylated and combinations thereof. Preferred nonionic surfactants are poly(ethylene glycol) fatty alcohol ethers, poly(propylene glycol) fatty alcohol ethers, mixed poly((ethylene)(propylene) glycol) fatty alcohol ethers, poly(ethylene glycol) fatty acid esters, alkoxylated acetylenic diols, fluoro containing tensides and polysiloxane based tensides.

Suitable anionic surfactants for use in the separation liquids according to the present invention, if any, are for example fatty alcohol sulfates, alkyl sulfonates, alkyl benzene sulfonates, sulfosuccinates, alkoxylated fatty alcohol sulfates, fatty alcohol ether phosphates, alkoxylated fatty alcohol ether phosphates, mono-glyceride sulfates and combinations thereof. Herein alkoxylated can in particular mean ethoxylated, propoxylated, butoxylated and combinations thereof. Particularly suitable are sulfosuccinates, especially the sodium salt of di(ethylhexyl) sulfo succinic acid. Suitable cationic surfactants for use in the separation liquids according to the present invention, if any, are for example quaternary ammonium compounds, quaternized amine ethoxylates, alkyl dimethylamines and alkyl amidopropylamines. Eligible amphoteric surfactants, if any, can be exemplified by betaines.

If a surfactant is used in the aqueous separation liquid according to the present invention, it is typically comprised in the liquid in an amount in the range from 1 ppm, preferably 10 ppm, more preferably 30 ppm, most preferably 100 ppm to 2,000 ppm, preferably 1,000 ppm, more preferably 500 ppm, wherein part(s) per million (ppm) each refers to parts by weight, based on the total weight of the liquid.

The aqueous separation liquid according to the present invention typically has a surface tension at 20° C. in the range of 40 to 70 mN/m such as 45 to 65 mN/m or 50 to 60 mN/m. The surface tension can for example be determined by the bubble pressure method using a SITA DynoTester+ tensiometer commercially available from SITA Messtechnik GmbH, Germany.

The separation liquids according to the present invention are useful to capture effectively paint overspray from different sources such as water-based coating compositions or solvent-based coating compositions. Depending on the nature of the paint to be captured, the aqueous separation liquid according to the present invention may additionally comprise one or more paint detackifying agent(s) in order to assist in preventing the adherence of paint particles to deposition surfaces and to facilitate the removal of captured paint components from the separation liquid. However, it was found that the use of a detackifing agent may not be required to achieve satisfactory performance when the aqueous separation liquid comprises a cellulose derivative of suitably low molecular weight such as a cellulose derivative having a viscosity of less than 50 mPa·s or less than 30 mPa·s in terms of outflow time measured as defined above. If a detackifying agent is nevertheless used in the aqueous separation liquid according to the present invention, it is not particularly limited and the paint denaturing effect caused thereby can rely on different mechanisms such as an agglomeration and/or a chemical reaction of the captured overspray particles. Thus any detackifying agent known from the prior art can be employed as long as it does not interfere with the other components present in the separation liquid and their specific effects as set forth above. The optional paint detackifying agent, if any, for use in the separation liquid according to the present invention can for example be an inorganic material such as colloidal silica, a silicate (e.g. talc), an alumosilicate (e.g. clay or bentonite) or a salt of a polyvalent metal such as Al, Zn, Ca, Zr or Fe like those described in WO 2010/025810. Suitable paint detackifying agents are further polymers such as polyacrylamides, polymethacrylamides, copolymers of (meth)acrylic acid with other ethylenically unsaturated monomers like styrene, melamine-formaldehyde adducts, starch, chitosan, tannin, polyquarternary amine polymers such as poly(diallyldimethylammonium chloride) and polycarboxylates such as metal salts of polyaspartic acid as well as wax emulsions, polyamide amines and polyamines such as e.g. ethylenediamine or 2-methyl-1,5-pentamethylenediamine. Combinations of more than one of such detackifying agents can be used as well. Preferably, the paint detackifying agent, if any, is selected from polyamines, polyamide amines, polyquarternary amine polymers, alumosilicates, silicates, aluminum compounds, polycarboxylates and combinations thereof.

The amount of paint detackifying agent, if present in the aqueous separation liquid according to the present invention, is typically in the range from 0.1 wt. %, preferably 0.2 wt. %, more preferably 0.5 wt. %, to 20 wt. %, preferably 10 wt. %, more preferably 5 wt. %, most preferably 2 wt. %, based on the total weight of the liquid.

When using amine-functional or carboxylate-functional detackifying agent and/or agglomeration agent the separation liquid should preferably not be acidic in order to avoid a degradation of the effectivity of the amine or carboxylate functionalities due to protonation. Generally it is preferred, if the aqueous separation liquid according to the present invention has a pH value in the range from 7.0 to 9.5.

When use of the separation liquid according to the present invention in a wet electrostatic separation unit is intended the separation liquid should have a certain electrical conductivity. The separation liquid may for example have an electrical conductivity of at least $5 \cdot 10^{-4}$ S/m, preferably at least 0.01 S/m, more preferably at least 5 S/m. The electrical conductivity may be imparted by any one of the aforementioned components as far as they are of electrolytic nature, however also additional electrolytes such as salts like NaCl, KCl or the like could be added in an amount suitable for adjusting the desired level of electrical conductivity.

As the case may be, the aqueous separation liquid according to the present invention can optionally comprise one or more than one further component(s) conventionally used in separation liquids known from the prior art such as preservative agents, biocides, pH-regulators and/or defoamers. Typically such additional components, if present in the aqueous separation liquid according to the present invention, are comprised in the liquid in an amount of in total not more than 10 wt. %, preferably not more than 5 wt. %, more preferably not more than 1 wt. %, based on the total weight of the liquid. As a characteristic feature the aqueous separation liquids according to the present invention exhibit only a weak propensity to foaming so that it is usually not necessary to add a defoamer.

The present invention also relates to a process for removing paint overspray from a paint spray booth that makes use of the aqueous separation liquid as defined above. In the context of the present invention, "(paint) overspray" or "(paint) overspray particles" irrespective of the actual entity size and physical state of the constituent components such as solid, liquid or a mixture of liquid and solid components collectively refers to the entirety of particles and droplets making up the paint overspray, i.e. the portion of the sprayed paint that is not transferred to the object being painted, unless the contrary is explicitly indicated. As set forth above, the process comprises:
  i) directing a gas stream through a paint spray booth;
  ii) contacting paint overspray with the gas stream flowing through the paint booth thereby forming an overspray-laden gas stream containing paint particles and/or droplets dispersed therein,
  iii) forming a flowing substantially continuous liquid film of the aqueous separation liquid according to the present invention on at least one surface that defines at least a part of the flow path of the overspray-laden gas stream;
  iv) contacting the overspray-laden gas stream with said liquid film, thereby transferring paint particles and/or droplets from the overspray-laden gas stream into the separation liquid to form a paint loaded separation liquid; and
  v) removing the paint loaded separation liquid and the gas stream having a reduced overspray load.

The gas stream used to take up the paint overspray, which is formed when spray painting a substrate in the booth, is typically generated by a fan or ventilation system. As carrier gas for the gas stream preferably air is used since it is readily available at low cost. The gas stream is typically directed through the paint spray booth in step i) in a down-flow mode, flowing around the substrate that is painted. The gas stream is usually directed through the booth with a substantial velocity, e.g. with a velocity of at least 0.5 m/s, or at least 1 m/s, or at least 5 m/s. Thereby it is ensured that the paint overspray is effectively entrained and transported away by the gas stream upon the contacting in step ii) to avoid fouling and contamination of the walls of the paint booth, and facilitate a fast removal of the paint overspray from the paint spray booth. This is especially important in automated high capacity lines wherein multiple substrates are sprayed with different colors to avoid contamination of the following substrate.

The at least one surface whereon in step iii) a flowing substantially continuous liquid film of the aqueous separation liquid is formed (also referred to herein as deposition surface or contact surface) can be any surface of a solid structural element that defines at least a part of the flow path of the overspray-laden gas stream. By defining at least a part of the flow path it is meant that the surface of the structural element either confines the maximum spatial extension of the overspray-laden gas stream forming at least a part of the flow channel or that the surface is part of a structural element that is positioned within the flow channel and flowed around by the overspray-laden gas stream. Said structural elements can e.g. be baffle plates or sheets, usually made of metal such as stainless steel or corrosion-resistant aluminum alloys. In the above described embodiment with a down-flow mode of the carrier gas stream through the paint booth the contact surfaces are typically positioned below the spraying area of the paint spray booth. The aqueous separation liquid according to the present invention can be applied to the contact surfaces by any means suitable to form a flowing substantially continuous liquid film thereon, e.g. by a mechanical applicator, by spraying or spilling over from a liquid reservoir. The contact surfaces are preferably inclined or vertically arranged so that liquid applied thereto, e.g. at the top, flows downwards by means of gravity.

The contact surfaces may for example be formed by two spaced downward converging baffle plates providing together a funnel type arrangement, which may span the whole width of the paint spray booth underneath the spraying level. Herein, it is preferred that the opposite plates forming the funnel do not overlap so that there is no separation fluid flowing from one plate to the other plate thereby creating a curtain that has to be penetrated by the gas stream because such an arrangement is prone to create turbulences. In another arrangement that is particularly suitable for electrostatic scrubbing the contact surfaces are formed by a plurality of inclined or vertically arranged parallel-sided plates spaced from one another such that the overspray-laden gas stream flows in the clearance between adjacent plates. Such arrangement likewise avoids turbulences and manages gas flow without any major pressure drop. Generally it is desirable to avoid turbulences in the process according to the present invention since they may render maintaining substantially continuous and uniform flowing liquid films on the contact surfaces difficult. Moreover, a turbulent gas flow promotes an accumulation of moisture in the gas stream, which necessitates energy intensive purification and treatment of the gas stream obtained after the particle removal.

The overspray-laden gas stream is brought into contact with the flowing substantially continuous liquid film of the aqueous separation liquid formed on the contact surface(s) in step iv) of the process according to the present invention. Thereby paint particles and/or droplets comprised in the overspray-laden gas stream that impinge on the liquid film are captured by the liquid and transported away by the flow of the liquid. The transfer of the overspray particles is particularly effective if the overspray-laden gas stream is directed towards the flooded contact surface(s). Herein, 'directing towards' means that the overspray-laden gas stream has a momentum component orthogonal to the contact surface, or in other words the gas stream impinges under an angle, e.g. an angle in the range from 10 to 90 degrees, onto the contact surface. This would e.g. be the case when employing the above-described funnel type arrangement of baffle structures in a down-flow mode of the generated carrier gas stream. However, also in case of a parallel flow of the gas stream with respect to the flooded contact surfaces an efficient transfer of paint particles and/or droplets from the overspray-laden gas stream into the separation liquid can be achieved, e.g. when the transfer of particles and/or droplets into the flowing film of the aqueous separation liquid is assisted by an electric field as set forth below.

As a characteristic advantage of the process, the separation liquids according to the present invention enable forming and maintaining stable, substantially uniform, coherent, continuously flowing films on strongly inclined and/or vertical contact surfaces even when exposed to a high velocity gas stream loaded with impinging particles and when edges or distinctly curved elements are within the flow path of the liquid. Moreover, the aqueous separation liquid can be applied to the contact surfaces at comparatively high flow rates of e.g. greater than 2 $L/(m^2·min)$ such as in a range from 3 to 15 $L/(m^2·min)$ or even higher without adversely affecting the film flow properties, in particular without the detachment of droplets at discontinuities on the flow path or the formation of hangers. Due to the corresponding relatively thick film thicknesses the risk that some impinging overspray particles may penetrate through the liquid film and stick to the underlying bare contact surface can be reduced, which is considered beneficial to prevent disturbing paint deposits that persistently adhere to the contact surface.

In one particularly preferred embodiment, the contacting in step iv) comprises directing the overspray-laden gas stream through an electrostatic scrubber, wherein particles and/or droplets dispersed in the gas stream are ionized and then directed by an electric field to the flowing substantially continuous liquid film of the aqueous separation liquid thereby transferring paint particles and/or droplets from the overspray-laden gas stream into the separation liquid to form the paint loaded separation liquid. Suitable electrostatic scrubbers for use in the process of the present invention are known per se from the prior art such as e.g. from WO 2010/025810 A1 or the E-Scrub system described above. Typically the electrostatic scrubber includes multiple plates, e.g. parallel and/or vertically arranged plates, spaced from one another whereon a flowing substantially continuous film of an aqueous separation liquid is each formed and electrodes positioned between the plates, which are connected to a high voltage source to charge the electrodes with an opposite charge with respect to the plates. Particles and/or droplets dispersed in the gas stream, which flows through the spaces in between the plates, are ionized e.g. by means of a corona discharge at the electrodes positioned between the plates. The resulting ionized particles and/or droplets are thus directed by the electrical field to the oppositely charged plates where they are taken up by the film of aqueous separation liquid. Due to the continuous flow of the liquid film always a fresh surface of separation liquid is available to receive the paint components and the captured overspray particles are transported downward with the flowing separation liquid.

The paint loaded separation liquid obtained in step iv) of the process according to the present invention is typically collected at the bottom of the wet separation unit in a drain for removal from the wet separation unit. The removed paint loaded separation liquid may optionally be further processed to at least partially separate paint components from the separation liquid to obtain a purified separation liquid (step vi). According to a preferred embodiment of the present invention, the separation of the paint components from the removed separation liquid in step vi) can be achieved by subjecting the removed paint loaded separation liquid to centrifugation. Suitable centrifuges that can be used include for instance decanters and separators as commercially available e.g. from Flottweg S E, Alfa Laval or GEA Westfalia. It is to be understood though that any other technique effective in separating paint components from the paint loaded separation liquid such as for example sedimentation, flotation, filtration, membrane filtration or reverse osmosis could be used in the process according to the present invention as well. However, the aqueous separation liquids according to the present invention have been found to enable facile paint separation, typically without the need for auxiliary agents such as flocculants, by means of centrifugation-based techniques, which are established low cost and large scale separation techniques. Consequently use of centrifugation for separation of the paint components is particularly attractive from an economical point of view. Paint sludge obtained by carrying out the optional purification step vi) is generally removed for further processing or disposal, whereas the resulting purified separation liquid is preferably at least partially recycled to step iii) of the process according to the present invention. Prior to recycling, the separation liquid can be further purified to avoid build-up of unwanted products that are soluble in the separation liquid and/or adjusted e.g. by replenishing possibly consumed or unintentionally removed functional components of the liquid. These actions may preferably be performed in a partial side stream in order to avoid costly complete treatment of the separation liquid and to keep the energy consumption low.

The process according to the present invention enables effective removal of overspray particles of different paint sources including water-based and solvent based paint formulations from the gas stream of a paint spray booth. Preferably the removed gas stream is substantially free of paint overspray. Herein, "substantially free" can mean that the content of condensed phase matter under standard conditions (20° C., 101.3 kPa) is less than 10 $mg/m^3$ such as less than 2 $mg/m^3$, or less than 0.5 $mg/m^3$. On the other hand the removed gas stream may still comprise noticeable amounts of volatile paint components such as volatile organic compounds. Thus further purification of the removed gas stream for example by absorption, adsorption, thermal oxidation or any combination thereof may be advantageous, especially when the gas stream shall be recycled. Moreover, it may be desirable to adjust the temperature and/or moisture content of the carrier gas prior to recycling. Accordingly, the gas stream removed from the wet separation unit may optionally be subjected to conditioning and/or further purification to obtain a processed gas stream (step vii). In a preferred embodiment the process according to the present invention includes at least partially recycling the processed gas stream to step i). A high recycling ratio of the gas stream of at least 60 vol. %, preferably at least 65 vol. %, more preferred at least 70 vol. %, at least 75 vol. %, at least 85 vol. %, most preferred at least 90 vol. %, at least 95 vol. %, at least 97 vol. %, or at least 99 vol. % can be achieved by the process according to the present invention. Thus the amount of energy required for adjusting the temperature and moisture content of the gas stream is minimized.

The above-described process for removing paint overspray from a paint spray booth and the aqueous separation liquid can be efficiently used in the above method for painting a substrate according to the present invention. This method is suitable for a highly automated continuous or semi-continuous operation applicable to spray painting of any kind of substrates. This method and the process for removing paint overspray from a paint spray booth according to the present invention can be conducted in a stable, safe and reliable manner with no or minimum maintenance for a prolonged period. A high recycling ratio of all carrier streams, i.e. gas stream and aqueous separation liquid, and low energy consumption can be realized, which makes the process and/or the method cost-efficient and environment-friendly. Thus, said process for removing paint overspray from a paint spray booth and the method for painting a substrate making use thereof are particularly suitable for high capacity coating lines, especially those used by the automotive industry, although they might also be used in painting other substrates, like in the furniture or household appliance industry, or for further industrial painting operations.

The present invention will now be explained in more detail with reference to the following non-limiting Examples.

EXAMPLES

1. Cellulose Derivative Component

Hydroxyethyl cellulose (HEC) materials of different molecular weight grades were investigated for their effect on the rheology and other properties of aqueous separation liquids. The HECs were purchased from SE Tylose GmbH & Co. KG, Germany, and the viscosity in aqueous solution as a measure of the average molecular weight determined as follows:

The moisture content of the HEC powders was determined by weighing a sample prior to and after drying in a cabinet dryer and calculating the relative difference. For each powder, a solution in water having a concentration of 1 wt. % of the respective HEC, based on the total weight of the solution was then prepared by: (i) providing an amount of about 5 g of HEC powder, the exact weight thereof being determined by weighing, (ii) adding water in an amount calculated such that the amount of dry matter of HEC powder corresponds to 1 wt. % of the total weight of the resulting mixture of HEC powder and water, (iii) dispersing the powder in the water using an Ultra Turrax operated at 14,000 rpm for 20 min and (iv) subsequent stirring of the dispersion using an IKA stirrer operated at 502 rpm for 45 min.

The viscosity of the resulting visually clear solutions was then measured with a Visco Tester VT5 using a R2 spindle at a temperature of 20° C. for different velocities of rotation between 0.3 and 200 rpm. Each data point was read after a period of 30 s at the respective velocity of rotation. Table 1 summarizes the viscosities measured for the solutions of the different investigated HEC materials at a velocity of rotation of 60 rpm.

TABLE 1

| Cellulose derivative | Viscosity @ 60 rpm [mPa · s] |
|---|---|
| A) Tylose H10 YG4 | 24 |
| B) Tylose H20 P2 | 32 |
| C) Tylose H200 YP2 | 79 |
| D) Tylose H1,000 YP2 | 164 |
| E) Tylose H 100.000 YP2 | n.m. | n.m.: not measurable due to too high viscosity (>>200 mPa · s)

All of the tested HECs had a molar degree of substitution in the range from 2.0 to 2.5.

2. Flow Properties of Aqueous Separation Liquids in Model

A model was constructed to study the flow of aqueous separation liquids on a structure having a flow path similar to existing commercial wet separation units. The model comprises a structure of a vertically arranged rectangular metal sheet, which has been bent rearwards at about one third of its height measured from its lower end by an angle of 45 degrees thereby forming a lower inclined section connected to an upper vertically aligned section by an edge. This structure is attached with its lower end to the upper edge of one side of a matching cubuid open-top container. At the rear side of said structure a trough is attached flush to the upper end of the vertical section. A pump and pipes are provided to continuously transport liquid from the bottom container to the trough. When the trough is filled, liquid spills over and flows down under the effect of gravity over the front surface of the vertical section of the metal structure and via the edge over the bottom-facing surface of the inclined section into the container where it is collected for being pumped back into the trough.

The following aqueous separation liquids prepared by combining the components according to Table 2 comprising each a different HEC as rheology modifier were tested on the above-described model. The amounts of thickener were selected such that the viscosities of the tested liquids were comparable. The liquids were circulated by the pump at a rate of 320 L/(m²·h).

TABLE 2

|  | Example 1 | Example 2 | Example 3 | Comparative Example 4 |
|---|---|---|---|---|
| Cellulose derivative | A | C | D | E |
|  | 1.7 wt. % | 1.14 wt. % | 0.55 wt. % | 0.32 wt. % |
| Glycerol | 15 wt. % | 15 wt. % | 15 wt. % | 15 wt. % |
| Water | 83.3 wt. % | 83.86 wt. % | 84.45 wt. % | 84.68 wt. % |

TABLE 2-continued

|  | Example 1 | Example 2 | Example 3 | Comparative Example 4 |
| --- | --- | --- | --- | --- |
| Viscosity[1] | 19 s | 23 | 23 | 22 |
| Flow characteristics | Coherent, uniform continuously flowing film with a wavy structure, no tearing or droplet formation at edge and slope | Coherent, uniform continuously flowing film with a wavy structure, no tearing or droplet formation at edge and slope | Coherent, uniform continuously flowing film with a wavy structure, occasional detachment of droplets at edge | continuously flowing film, wavy structure, formation of hangers, severe detachment of droplets at edge and slope |

[1]measured according to ISO 2431 using a 4 mm flow cup at 20° C.

Table 2 summarizes the flow characteristics determined by visual inspection for the tested liquids. The tested aqueous separation liquids comprising the two HECs of the lowest molecular weights (Examples 1 and 2) yielded each a coherent, substantially uniform continuously flowing film with a wavy surface structure. The film flowed gently over the edge and the sloped part of the model. No detachment of droplets, formation of hangers or local tearing of the film was observed. In case of Example 3 films with similar flow characteristics were formed, however, a detachment of droplets from the flowing film was occasionally observed at the edge. For the separation liquid comprising the highest molecular cellulose derivative tested (Example 4) a formation of hangers was observed and a severe detachment of droplets occurred at the edge and on the sloped part of the flow path. These findings illustrate that cellulose derivatives of low average molecular weight provide superior rheological properties compared to their higher molecular analogues conventionally employed as thickener in aqueous separation liquids.

In order to investigate the effect of an surfactant, 200 μL of an alkoxylated acetylenic diol surfactant were each added to 5 L of the liquids of Examples 1 to 4 and the resulting surfactant-containing liquids were tested for their flow behaviour in the above-described model. The results are summarized in Table 3.

TABLE 3

|  | Example 5 | Example 6 | Example 7 | Comparative Example 8 |
| --- | --- | --- | --- | --- |
| Composition | 5 L liquid of Ex. 1 + 200 μL surfactant[1] | 5 L liquid of Ex. 2 + 200 μL surfactant[1] | 5 L liquid of Ex. 3 + 200 μL surfactant[1] | 5 L liquid of Ex. 4 + 200 μL surfactant[1] |
| Viscosity[2] | 19 s | 23 | 23 | 22 |
| Flow characteristics | Smooth, uniform, coherent, continuously flowing film, no tearing or droplet formation at edge and slope | Smooth, uniform, coherent, continuously flowing film, no tearing or droplet formation at edge and slope | Smooth, uniform, coherent, continuously flowing film, no tearing or droplet formation at edge and slope | Smooth, coherent, continuously flowing film, formation of hangers, severe detachment of droplets at edge and slope |

[1]alkoxylated acetylenic diol surfactant from Air Products Chemicals Europe B.V.
[2]measured according to ISO 2431 using a 4 mm flow cup at 20° C.

Comparing Examples 5-8 to their counterparts without added surfactant (Examples 1-4) shows that the surfactant smoothens the film. The resulting continuously flowing films are substantially uniform except for Comparative Example 8, wherein hangers are formed; a wavy surface structure is at most weakly observable. In case of the separation liquid comprising cellulose derivative D the detachment of droplets at the edge can be avoided by the use of the surfactant (cf. Example 7 versus Example 3). However, for cellulose derivatives with substantially higher average molecular weight, the presence of a surfactant does not prevent the formation of hangers and the severe detachment of droplets was invariably observed at the edge and sloped part of the flow model (cf. Comparative Example 8).

The foregoing experiments demonstrate that coherent, uniform continuously flowing films can be formed and maintained on strongly inclined and vertical deposition structures from aqueous separation liquids according to the present invention comprising an organic water-soluble polyol and a cellulose derivative of suitably low average molecular weight without the formation of hangers, tearing of the film or a detrimental detachment of droplets even when edges are within the flow path. These flow characteristic are attainable at comparatively high flow rates envisioned to counteract a penetration of impinging overspray particles to the underlying surface thereby helping to avoid paint deposits adhering to the deposition structures. The wavy surface structure of the flowing films is moreover deemed to be supportive for washing off captured paint particles from the flooded deposition structures in wet deposition units. However, if preferred, smooth flowing films can likewise be generated, if a surfactant is incorporated in the separation liquid.

3. Foaming of Aqueous Separation Liquids

No foam formation was observed for the aqueous separation liquids of Examples 1 to 8 in the flow experiments using the above-described model.

Furthermore the propensity of the aqueous separation liquids of Examples 5 to 8 to form persistent foam was investigated in vitro. For each foaming test 50 mL of the respective liquid were filled in a graduated 100 mL cylinder. The cylinder was then closed with a plug and shaken by hand intensively for 1 min. The degassing of the resulting fine-pored foams was classified on a qualitative basis, wherein 'rapid' means a time for degassing of less than 1 min, 'moderate' means a time for degassing in the range of 1 to 2 min and 'slow' means a time for degassing of more than 2 min. The results are summarized in Table 4.

Faster degassing foams are obtained when the cellulose derivative used as rheology modifier in the liquid is of lower average molecular weight.

4. Paint Separation

The aqueous separation liquids of Examples 1-4 were tested also for paint separation by centrifugation. For each test, a paint composition (water-based base coat 'Blazing Red Graz' from PPG Industries) and a polyamine detackifier, if any, were added to the respective liquid in the proportions indicated in Table 5. The samples were homogenized by means of an Ultra Turrax. An aliquot of the resulting dispersion was then filled in a test tube and subjected to centrifugation at 4,000 rpm for 10 min using a Hettich EBA 3S centrifuge. Separation of the paint solids from the liquid phase was evaluated by visual inspection after centrifugation and was rated qualitatively on a numerical scale from 0 to 4, wherein '0' means a turbid opaque dispersion that is visually indistinguishable to the state prior to centrifugation, '1' means a turbid opaque dispersion over paint deposits formed by centrifugation, '2' means translucent colored liquid phase with scattered dispersed paint particles over paint deposits formed by centrifugation, '3' means lightly colored clear liquid phase over paint deposits formed by centrifugation and '4' means a transparent clear colorless liquid phase over paint deposits formed by centrifugation. The results are summarized in Table 5 and indicate that efficient removal of the paint component may be achieved by centrifugation for the aqueous separation liquids that comprise a cellulose derivative of suitably low average molecular weight (Examples 9, 10). As illustrated by Example 13, the aqueous separation liquid that comprises the lowest molecular weight HEC investigated enables facile paint separation even without the need for any auxiliary agents. The paint separation from liquids that comprise cellulose derivative D (Example 11) proved to be more difficult, but could still be improved to satisfactory performance by adjustment of the centrifugation conditions. In case of the liquid containing the cellulose derivative of the highest investigated molecular weight no efficient paint separation was possible by centrifugation though under the tested conditions (Comparative Example 12).

The liquids of Examples 5-8 were tested analogously, but the additional presence of the surfactant was found to have no noticeable effect on the paint separation performance.

TABLE 4

|  | Example 5 | Example 6 | Example 7 | Comparative Example 8 |
|---|---|---|---|---|
| Composition | 5 L liquid of Ex. 1 + 200 µL surfactant[1] | 5 L liquid of Ex. 2 + 200 µL surfactant[1] | 5 L liquid of Ex. 3 + 200 µL surfactant[1] | 5 L liquid of Ex. 4 + 200 µL surfactant[1] |
| Viscosity[2] | 19 s | 23 | 23 | 22 |
| Foam degassing | rapid | moderate | slow | slow |

[1]alkoxylated acetylenic diol surfactant from Air Products Chemicals Europe B.V.
[2]measured according to ISO 2431 using a 4 mm flow cup at 20° C.

TABLE 5

|  | Example 9 | Example 10 | Example 11 | Comparative Example 12 | Example 13 |
|---|---|---|---|---|---|
| Composition | 96.5 wt. % liquid of Ex. 1, 3 wt. % paint, 0.5 wt. % polyamine | 96.5 wt. % liquid of Ex. 2, 3 wt. % paint, 0.5 wt. % polyamine | 96.5 wt. % liquid of Ex. 3, 3 wt. % paint, 0.5 wt. % polyamine | 96.5 wt. % liquid of Comp. Ex. 4, 3 wt. % paint, 0.5 wt. % polyamine | 97 wt. % liquid of Ex. 1, 3 wt. % paint |
| Paint separation | 3 | 3 | 1 | 0 | 3 |

5. Application in Spray Booth with Electrostatic Scrubber

Example 14

A liquid of
1.7 wt. % cellulose derivative A
15.0 wt. % glycerol
83.3 wt. % water
viscosity @ 20° C., ISO 2431, 4 mm flow cup: 20 s
was tested as separation liquid for removing overspray of a water-based base coat composition (BMW, Germany) from an air stream in a commercial E-Scrub system (Eisenmann, Germany). The liquid formed coherent, uniform continuously flowing films on the flushed deposition surfaces. The flow rate of the liquid was about 4 L/(m²·h). Addition of surfactant (alkoxylated acetylenic diol from Air Products Chemicals Europe B.V.) was found to further improve the wetting of the surfaces. Paint overspray was efficiently removed from the air stream by the separation liquid with no adherent paint deposits observed on the deposition surfaces. Stable and reliable operation of the system with good high voltage control was achieved over the entire test (spraying on four consecutive days) despite of a significant build-up of paint in the circulated separation liquid, which caused an increase of the viscosity to 40 s (@ 20° C., ISO 2431, 4 mm flow cup). No foam formation occurred. The captured paint could readily be removed from the liquid as sludge by centrifugation.

Example 15

A liquid of
1.2 wt. % cellulose derivative B
2.7 wt. % polyamine (detackifier)
11.1 wt. % glycerol
85.0 wt. % water
viscosity @ 20° C., ISO 2431, 4 mm flow cup: 28 s
was tested as separation liquid for removing overspray of a solvent-based 2K clear coat composition (BASF, Germany) from an air stream in a commercial E-Scrub system (Eisenmann, Germany). The liquid formed coherent, continuously flowing films on the flushed deposition surfaces. The flow rate of the liquid was about 2 L/(m²·h). Addition of surfactant (alkoxylated acetylenic diol from Air Products Chemicals Europe B.V.) was found to further improve the wetting of the surfaces. Paint overspray was efficiently removed from the air stream by the separation liquid. Minor paint deposits on the deposition surfaces were observed, but could be easily washed off. Stable and reliable operation of the system with good high voltage control was achieved over the entire test (spraying on three consecutive days). Some foam formation was observed in the liquid reservoir, however, no influence on the performance of the wet electrostatic unit was observed. The foam could be completely eliminated by addition of a small amount of a defoaming agent. The captured paint could be efficiently removed from the overspray-laden aqueous separation liquid by centrifugation.

These examples demonstrate that the aqueous separation liquids according to the present invention enable efficiently removing overspray of different paint sources from the gas stream of a paint spray booth without paint deposits persistently adhering to the deposition structures. These liquids are suitable for use in modern electrostatic wet separation units providing a stable, safe and reliable operation with no or minimum maintenance for a prolonged period. A removal of the captured paint components from the separation liquid can be carried out by established industrial methods such as centrifugation without the need of flocculants. Thus an efficient recycling of all carrier streams used in the process is possible.

The invention claimed is:

1. An aqueous separation liquid for capturing paint overspray from a gas stream comprising:
    a) at least 49.9 weight percent water, based on the total weight of the aqueous separation liquid,
    b) 5 to 50 weight percent of at least one organic water-soluble polyol, based on the total weight of the aqueous separation liquid, and
    c) at least one cellulose derivative having a viscosity of less than 200 mPa·s as measured with a Visco Tester VT5 using a R2 spindle at a velocity of rotation of 60 rpm and a temperature of 20° C. for a 1 weight percent solution of the cellulose derivative in water, based on the total weight of the solution,
    wherein components b) and c) are different from each other, and
    the aqueous separation liquid has a viscosity in terms of outflow time in the range from 11 s to 50 s, as measured according to ISO 2431:2011 using a 4 mm flow cup at 20° C.

2. The aqueous separation liquid of claim 1, wherein the at least one cellulose derivative has a viscosity of less than 100 mPa·s as measured with a Visco Tester VT5 using a R2 spindle at a velocity of rotation of 60 rpm and a temperature of 20° C. for a 1 weight percent solution of the cellulose derivative in water, based on the total weight of the solution.

3. The aqueous separation liquid claim 1, wherein the at least one cellulose derivative comprises a cellulose ether having a molar degree of substitution in the range from 2.0 to 2.5.

4. The aqueous separation liquid of claim 3, wherein the cellulose ether comprises hydroxyethyl cellulose.

5. The aqueous separation liquid of claim 4, wherein the hydroxyethyl cellulose has a molar degree of substitution of from 2.0 to 2.

6. The aqueous separation liquid of claim 1, wherein the at least one organic water-soluble polyol comprises a monomeric polyol or a polymeric polyol.

7. The aqueous separation liquid of claim 6, wherein the monomeric polyol comprises a monomeric polyol having at least three hydroxyl groups per molecule.

8. The aqueous separation liquid of claim 6, wherein the monomeric polyol comprises ethylene glycol, propylene glycol, glycerol, pentaerythritol, or combinations thereof.

9. The aqueous separation of claim 6, wherein the polymeric polyol comprises polymeric polyols having a number average molecular weight of 200 to 3,000, as measured by gel permeation chromatography using polystyrene calibration standards.

10. The aqueous separation according to claim 6, wherein the polymeric polyol comprises poly(ethylene glycols), poly(propylene glycols), mixed poly((ethylene)(propylene) glycols), polyester polyols, acrylic polyols, polyurethane polyols, or combinations thereof.

11. The aqueous separation liquid of claim 1, wherein the aqueous separation liquid has a viscosity in terms of outflow time of 11 s to 50 s, as measured according to ISO 2431: 2011 using a 4 mm flow cup at 20° C.

12. The aqueous separation liquid of claim 1, comprising the at least one organic water-soluble polyol in an amount of 7 weight percent to 40 weight percent, based on the total weight of the aqueous separation liquid, and the at least one cellulose derivative in an amount of 0.1 weight percent to 10 weight percent, based on the total weight of the aqueous separation liquid.

13. The aqueous separation liquid of claim 1, further comprising at least one surfactant.

14. The aqueous separation liquid of claim 13, wherein the surfactant comprises at least one non-ionic surfactant comprising poly(alkylene glycol) fatty alcohol ethers, alkylphenol poly(alkylene glycol) ethers, poly(alkylene glycol) fatty acid esters, fatty acid mono glycerides, poly(alkylene glycol) mono fatty acid esters, fatty acid mono alkanol amides, fatty acid dialkanol amides, alkoxylated fatty acid mono alkanol amides, alkoxylated fatty acid dialkanol amides, fatty acid partial esters of pentaerythritol, alkoxylated fatty acid partial esters of pentaerythritol, sorbitan fatty acid esters, alkoxylated sorbitan fatty acid esters, acetylenic dials, alkoxylated acetylenic dials, alkyl amino oxides, alkoxylated alkyl amino oxides, fluoro containing tensides, 6 polysiloxane based tensides, or combinations thereof.

15. The aqueous separation liquid of claim 1, further comprising at least one paint detackifying agent comprising polyamines, polyamide amines, polyquarternary amine polymers, alumosilicates, silicates, aluminum compounds, polycarboxylates, or combinations thereof.

16. The aqueous separation liquid of claim 1, further comprising at least one additive comprising preservative agents, biocides, pH-regulators, defoamers, or combinations thereof.

17. A process for removing paint overspray from a paint spray booth comprising:
  i) directing a gas stream through a paint spray booth;
  ii) contacting paint overspray with the gas stream flowing through the paint spray booth thereby forming an overspray-laden gas stream containing paint particles and/or droplets dispersed therein,
  iii) forming a flowing substantially continuous liquid film of the aqueous separation liquid of claim 1 on at least one surface that defines at least a part of the flow path of the overspray-laden gas stream;
  iv) contacting the overspray-laden gas stream with said liquid film, thereby transferring paint particles and/or droplets from the overspray-laden gas stream into the separation liquid to form a paint loaded separation liquid; and
  v) removing the paint loaded separation liquid and the gas stream having a reduced overspray load.

18. The process of claim 17, wherein the contacting in step iv) comprises directing the overspray-laden gas stream through an electrostatic scrubber, wherein particles and/or droplets dispersed in the gas stream are ionized and then directed by an electric field to the flowing substantially continuous liquid film of the aqueous separation liquid thereby transferring paint particles and/or droplets from the overspray-laden gas stream into the separation liquid to form the paint loaded separation liquid.

19. The process of claim 17, further comprising:
  vi) at least partially separating the paint components from the removed paint loaded separation liquid to obtain a purified separation liquid, and/or
  vii) conditioning and/or further purifying the removed gas stream to obtain a processed gas stream; and optionally
  viii) at least partially recycling the purified separation liquid to step iii) and/or at least partially recycling the processed gas stream to step i).

20. A method for painting a substrate comprising:
  spraying a paint onto a substrate in a paint spraying booth, thereby
  obtaining a painted substrate and paint overspray; and
  removing the paint overspray with the process of claim 17.

* * * * *